(12) United States Patent
Gudkov et al.

(10) Patent No.: US 11,654,611 B2
(45) Date of Patent: May 23, 2023

(54) STRESS MONITORING OF 3D-PRINTED BUILDING STRUCTURES

(71) Applicant: Mighty Buildings, Inc., San Francisco, CA (US)

(72) Inventors: Stanislav Gudkov, Moscow (RU); Aleksei Dubov, San Mateo, CA (US); Evgeniy Ostanin, Moscow (RU)

(73) Assignee: Mighty Buildings, Inc., San Francisco, CA (US)

( * ) Notice: Subject to any disclaimer, the term of this patent is extended or adjusted under 35 U.S.C. 154(b) by 0 days.

(21) Appl. No.: 17/390,493

(22) Filed: Jul. 30, 2021

(65) Prior Publication Data
US 2023/0036241 A1    Feb. 2, 2023

(51) Int. Cl.
*B29C 64/106*    (2017.01)
*G01L 5/1627*    (2020.01)
*B33Y 30/00*    (2015.01)
*B33Y 10/00*    (2015.01)

(52) U.S. Cl.
CPC .......... *B29C 64/106* (2017.08); *G01L 5/1627* (2020.01); *B33Y 10/00* (2014.12); *B33Y 30/00* (2014.12)

(58) Field of Classification Search
None
See application file for complete search history.

(56) References Cited

U.S. PATENT DOCUMENTS

| | | |
|---|---|---|
| 2019/0248932 A1 | 8/2019 | Korshikov et al. |
| 2021/0046706 A1 | 2/2021 | Korshikov et al. |
| 2021/0078254 A1 | 3/2021 | Indyk et al. |

*Primary Examiner* — Yung-Sheng M Tsui
*Assistant Examiner* — Melody Tsui
(74) *Attorney, Agent, or Firm* — Cognition IP, P.C.; Edward Steakley; Justin White

(57) ABSTRACT

Systems and methods for monitoring stress in 3D-printed building structures using embedded and surface sensors. The sensors may be embedded during or after the 3D printing process. The sensors may be strain gauges integrally formed in the 3D-printed building structure or positioned on the surface of the 3D-printed building structure. The embedded and surface sensors may measure tensile and compressive deformation occurring during the printing process, material relaxation process, the transportation process, and at a final location of the 3D-printed building structure. Deformation data collected by the sensors may be compared to accepted threshold values based on the material of the 3D-printed building structure.

24 Claims, 16 Drawing Sheets

STRESS MONITORING OF 3D-PRINTED BUILDING STRUCTURES

BACKGROUND

The invention relates to advanced technology for stress monitoring of three-dimensional (3D) printed building structures. More specifically, the present invention relates to stress and strain evaluation and monitoring in geometrically complex structures and large-scale structures, such as 3D-printed building components and large-scale 3D-printed buildings.

Certain external or environmental factors and/or movement of 3D-printed building structures may cause forces to be applied to the structure that cause stresses or strains to the structure. For example, these forces may cause shrinkage, stressing, cracking and/or warping to portions of the 3D-printed building structures. These forces may occur during production, transportation, assembly and/or operation of the structures and cause damage or distortion to the 3D-printed building structure. Determining and evaluating potential stress or damage to a 3D-printed building structure is important to evaluate the structure's overall integrity. Such stress evaluation, however, is very challenging and difficult with current state-of-the-art stress measuring techniques.

Current state-of-the-art stress measuring techniques require the use of complex measuring equipment. These techniques are not suited for the evaluation and/or stress monitoring of 3D-printed building structures. For example, some techniques require a small hole of specified diameter and depth to be punched into a wall at a specific position. This technique releases some residual stress and produces a certain amount of strain. A strain measurement instrument is utilized to measure the released strain, and then, the magnitude of the residual stress released from the point may be calculated. One disadvantage of this technique is that it is a destructive type of testing and requires a number of holes to be drilled into the structure.

Similarly, some internal stress measuring techniques utilize the principle of "local stress relief" and include cutting a shallow groove on the structure to be tested. A grooved strain release value may be measured according to the relationship of groove depth and strain release rate. However, this technique is not particularly useful to measure strain in the case of 3D-printed building structures. 3D-printed building structures may include structural elements of a building where there is no direct access to the structural elements to be tested due to finishing materials. This technique does not allow measurements of stress arising in these 3D-printed building structures especially in internal areas of a 3D-printed that can not be accessed.

A need therefore exists to measure strain and other stresses of 3D-printed building structures while avoiding or causing structural damage to the 3D-printed building structure. To address this need, the present disclosure describes a system and method for using sensors for stress monitoring integrally formed within a 3D-printed building structure. The described monitoring system and methods provide a non-destructive approach to evaluating and monitoring internal stress and strain of geometrically complex 3D-printed building structures.

SUMMARY

Described herein are innovative systems and methods of stress monitoring of 3D-printed building structures using embedded sensors integrally formed during the printing of the structure. Methods of continuous internal and surface stress monitoring are described for the life-cycle of a 3D-printed building structure from production of the 3D-printed building structure, to transportation, to assembly and to operation of the 3D-printed building structure. The disclosed systems and methods provide stress monitoring solutions that involve the use of embedded sensors and surface sensors, which may be placed at strategic locations on a 3D-printed building structure to measure deformation and/or stresses that the 3D-printed building structure may be experiencing at various phases of the production, transportation, assembly and operation processes.

In one embodiment, a method of monitoring stress characteristics of a 3D-printed building structure is disclosed. Multiple layers of a printing material (e.g, a photopolymerizable composite material) are deposited in successive layers to form a 3D-printed building structure. The multiple layers form a structure with an external side surface. A recess may be milled into a portion of the external side surface of the 3D-printed building structure. The milled recess forms a cavity in the structure that has a substantially planar wall. A sensor system may be placed onto and adhered to the planar wall. In one embodiment, the sensor system includes a rigid frame assembled of wire with multiple attached strain gauges. The frame may include a first strain gauge attached to the frame in a first position and a second strain gauge attached to the frame in a second position perpendicular to the first position. In this context, these strain gauges may be referred to as embedded sensors applied to an external surface of the 3D-printed building structure. An output of the sensor system may be measured to determine changes in output values of the sensor system. The changes in the output values of the strain gauges may be measured to identify stress and/or structural deformations in the 3D-printed building structure. Examples of 3D printing may be found in publication US20210046706A1, titled 3D Printing of a Composite Material via Sequential Dual-Curing Polymerization; publication US20190248932A1, titled Composition of 3D Printing Construction Material; publication US202100078254A1, titled Optical Curing System for 3D printing.

In one embodiment, a method of monitoring stress characteristics of a 3D-printed building structure is disclosed. Multiple layers of printing material are deposited to form a 3D-printed building structure. The depositing of multiple layers may include placing a first sensor system onto a layer after the layer of printing material has been deposited. Another layer of the material is deposited onto a portion of the previously deposited layer. This next layer of printing material also covers a portion of the placed first sensor system. In one example, the first sensor system includes a first frame with a first strain gauge attached to the first frame in a first position, and a second strain gauge attached to the first frame in a second position perpendicular to the first position. Later measurements may be obtained from the first sensor system via the one or more outputs of the first and second strain gauges. Another second sensor system may be placed at other locations about the 3D-printed building structure while the building structure is being printed.

In another embodiment, there is a method of monitoring stress characteristics of a 3D-printed building structure. Multiple layers of a printing material may be deposited in successive layers ($n^{th}$ layers) to form a 3D-printed building structure. The $n^{th}$ layer may indicate the reference point, where an n−1 layer is deposited below the $n^{th}$ point and an n+1 layer is deposited over the n−1 layer. During formation of the 3D-printed building structure a sensor system is placed onto the n−1 layer after the n−1 layer has been deposited. The n+1 layer is then deposited onto the n−1 layer, atop the placed sensor system. In one embodiment, the sensor system includes a frame having multiple strain gauges attached. The frame may have a first strain gauge attached to the frame in a first position and a second strain gauge attached to the frame in a second position perpendicular to the first position. In this context, these strain gauges may be referred to as embedded sensors in the 3D-printed building structure. An output of the sensor system, and/or the respective strain gauges, may be measured to determine changes in output values of the sensor system. The changes in the output values may be used to identify stress and/or structural deformations in the 3D-printed building structure.

In another embodiment, there is a sensor system for measuring stress characteristics of a 3D-printed building structure. The sensor system includes a frame having attached thereto, a plurality of strain gauges including a first strain gauge and a second strain gauge. The first strain gauge is attached to the frame in a first position and the second strain gauge is attached to the frame in a second position perpendicular to the first position.

In another embodiment, there is a 3D-printed building structure having multiple printed layers, including a n−1 layer and a n+1 layer. A sensor system is integrally formed between the n−1 layer and the n+1 layer. This may be done during the production process of the 3D-printed building structure. The sensor system may include a frame with multiple strain gauges attached to the frame. A first strain gauge may be attached to the frame in a first position and a second strain gauge may be attached to the frame in a second position perpendicular to the first position. The sensor system may be measured to determine the outputs of the first and second strain gauges. The sensor system may include a third strain gauge attached to the frame in a third position where the third strain gauge is positioned from about 15 to 75 degrees relative to a vertical axis of the first strain.

In some embodiments, the frame may be a rigid structure, made of thick wires, intended to form a perimeter around and hold the fabric substrate. While the frame may be rigid, the fabric substrate may be neutral and provide no influence on the sensor system. A plurality of connecting wiring may be attached to the plurality of strain gauges to obtain or read the output of the strain gauges. The plurality of connecting wires may be soldered to one or more of the strain gauges, and the connecting wires may be fixed to the frame. In some examples, the frame may be sized such that the edges of the frame do not extend beyond edges of external surfaces of the 3D-printed building structure.

In various embodiments of the present disclosure, embedded sensors may contain a fabric substrate with a plurality of strain gauges located within the fabric substrate. A rigid frame composed of wire and flexible fabric substrate allow strain gauges to be placed in a required position but do not restrict the transfer of material stress to the strain gauges. The effect of the rigid frame and flexible fabric substrate provide a neutral influence on the sensor system. In some embodiments, the strain gauges may be connected to a strain measurement system via connecting wires. In one embodiment, the embedded sensors and surface sensors may additionally include a thermal sensor. The embedded and surface sensors may measure tensile and compressive deformation in isolation or in combination with each other to produce data related to deformation. Deformation data collected by the sensors may be compared to accepted threshold values based on the material of the 3D-printed building structure.

In various embodiments, the sensors may be oriented within or along with the 3D-printed building structure at a plurality of processing stages. In one embodiment, the embedded sensor may be placed on the 3D-printed layer during the printing process, wherein subsequent $n^{th}$ 3D-printed layers are laid over the embedded sensor. In various detailed embodiments, surface sensors may be installed into the 3D-printed building structure to measure tensile and compressive deformation along the Z-axis and Y-axis. The surface sensors may take deformation measurements immediately after installation and may continue to take measurements during the relaxation and transportation processes. The relaxation process may include various parameters, such as, but not limited to, cooling of the 3D-printed building structure. In some embodiments, surface sensors may be installed into milled grooves on the 3D-printed building structure. In various additional embodiments, data from embedded sensors and surface sensors in the 3D-printed building structure may be jointly processed to calculate shear deformation. The embedded and surface sensors may measure tensile and compressive deformation occurring during the printing process, during the relaxation process, during the transportation process, and at the final location of the 3D-printed building structure.

Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
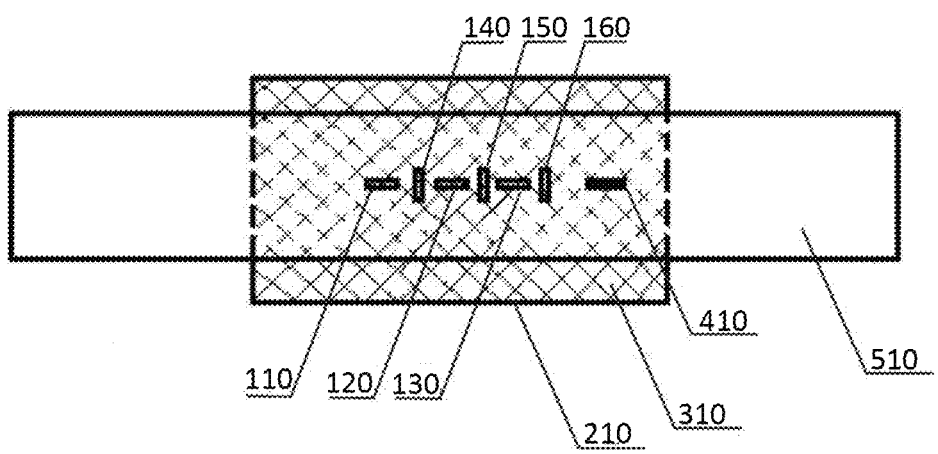
FIG. 1 illustrates a schematic diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however, it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well-known features may not have been described in detail to avoid unnecessarily obscuring the invention.

In addition, it should be understood that steps of the exemplary methods set forth in this patent can be performed in different orders than the order presented in this specification. Furthermore, some steps of the exemplary methods may be performed in parallel rather than being performed sequentially.

Three-dimensional printing material may have an elastic region capable of compressing. However, when a large external force is applied, such as a transportation load or installation impact, and exceeds the elastic limit of the three-dimensional printed structure, the strain generated on each section of the three-dimensional structure may not return to its initial state and maintains large residual strain. When a large residual strain occurs in a three-dimensional printed structure, the three-dimensional structure may be damaged.

Cracks may occur on the surface of a three-dimensional structure as a result of structural damage. In the case of a finished printed material, such as a printed building structure, locating cracks in the three-dimensional structure can be difficult. Further, there are many 3D-printed parts that may be difficult to visually inspect due to the complex geometry of the part.

The system and method described herein measures strain and other stresses occurring in 3D-printed building structures, yet avoids causing structural damage to the 3D-printed building structure. As further described in regard to the figures, the system and method provides for using sensors for stress monitoring inside a 3D-printed building structure. The described monitoring system and method provides a non-destructive approach to evaluating and monitoring internal stress and strain of geometrically complex 3D-printed building structures.

A diagram of an exemplary environment 100 in which embodiments may operate is shown in FIG. 1. In one embodiment, FIG. 1 depicts strain gauges 110, 120, 130, 140, 150, and 160 incorporated into the three-dimensional printed structure. The embedded sensor may be within a rectangular frame 210 made of wire with a diameter of 0.5-1 mm, with a flexible fabric substrate 310 stretched inside with strain gauges glued to it. The dimensions of frame 210 may be selected based on the condition of aligning the axis of the frame 210 with the axis of the 3D-printed layer 510 and the location of the wire outside the zone of influence on the readings of the strain gauges 110, 120, 130, 140, 150, 160. In one embodiment, the width of frame 210 may be 1.2-1.5 fold of the 3D-printed layer 510 widths. In one embodiment, the length of the frame may be 25% longer than the total length of the strain gauges 110, 120, 130, 140, 150, and 160.

A strain gauge may be defined as a sensor whose measured electrical resistance varies with changes in strain. The strain gauge converts an applied force or stress to an electrical signal that can be measured. A strain gauge may be formed of a resistive foil with a gauge backing. For example, strain gauges may operate to convert force, pressure, tension, or overall strain into an electrical resistance which may be measured. Resistance may be calculated through a measured voltage difference across two points. The two points may be configured in parallel or series. A strain gauge within a circuit will change the measured voltage difference depending on strain applied to the strain gauge. The signal from the strain gauge may be amplified to increase the signal strength and a noise filter applied to the signal.

The strain gauges may be of various types, for example linear, double linear, full bridge, half bridge, quarter bridge, shear, column, membrane Rosette, 45° Rosette, and 90° Rosette strain gauges. Various types of strain gauges may be differentiated by orientation of strain gauges, number of strain gauges, conductors within the strain gauges, and the type of strain being measured.

The strain gauges 110, 120, 130, 140, 150, and 160 may be used to measure internal deformations of the 3D-printed building structure and thermal sensor 410 may calculate thermal deformation based on detected temperatures and material characteristics. In one embodiment, the thermal sensor 410 may be used to correlate temperature to the strain being monitored on the 3D-printed building structure. The strain gauges 110, 120, 130 may be intended for longitudinal deformation measuring. The strain gauges 140, 150, 160 may be intended for cross-layer deformation measuring. In one embodiment, signals from strain gauges 110, 120, 130 may be averaged to calculate one average value of longitudinal deformation. Strain gauges 110, 120, 130, 140, 150, 160 may be connected to a strain measurement system via connecting wires. In one embodiment, connecting wires may be fixed to the guide frame to reduce the mechanical impact on the strain gauges.

In some embodiments, strain gauges 110, 120, 130, 140, 150, 160 must withstand elevated temperatures, as the temperature in the print area may reach 100° C. In one embodiment, strain gauges 110, 120, 130, 140, 150, 160 may be glued at the longitudinal axis of symmetry of the fabric substrate 310 with industrial quick-setting adhesive. In one embodiment, strain gauges may have a lower thermal expansion coefficient than the 3D-printed building structure material to measure the thermal expansions that occur over the course of building operations.

In some embodiments, fabric substrate 310 provides a matrix for the strain gauges. This matrix allows the strain gauges 110, 120, 130, 140, 150, 160 to be accurately positioned on the 3D-printed layer 510 while not corrupting the deformation data, as the Young modulus of the fabric substrate 310 are many times less than the Young modulus of the 3D-printed building structure material. Young's modulus is a measure of the ability of a material to withstand changes in length when under lengthwise tension or compression. Young's modulus is equal to the longitudinal stress divided by the strain. In some embodiments, the fabric substrate may be tight and impregnated with a treatment agent to provide reliable adhesion to various printed layers. The flexibility of fabric substrate 310 provides a neutral influence on the strain gauges. In some embodiments, markings may be applied to the fabric substrate 310 for manual centering of the sensor along with the 3D-printed layer 510 axes. It is understood that in some embodiments, more or fewer than six strain gauges may be used.

Method of Installing an Embedded Sensor in a 3D-Printed Building Structure

Figure 2A:
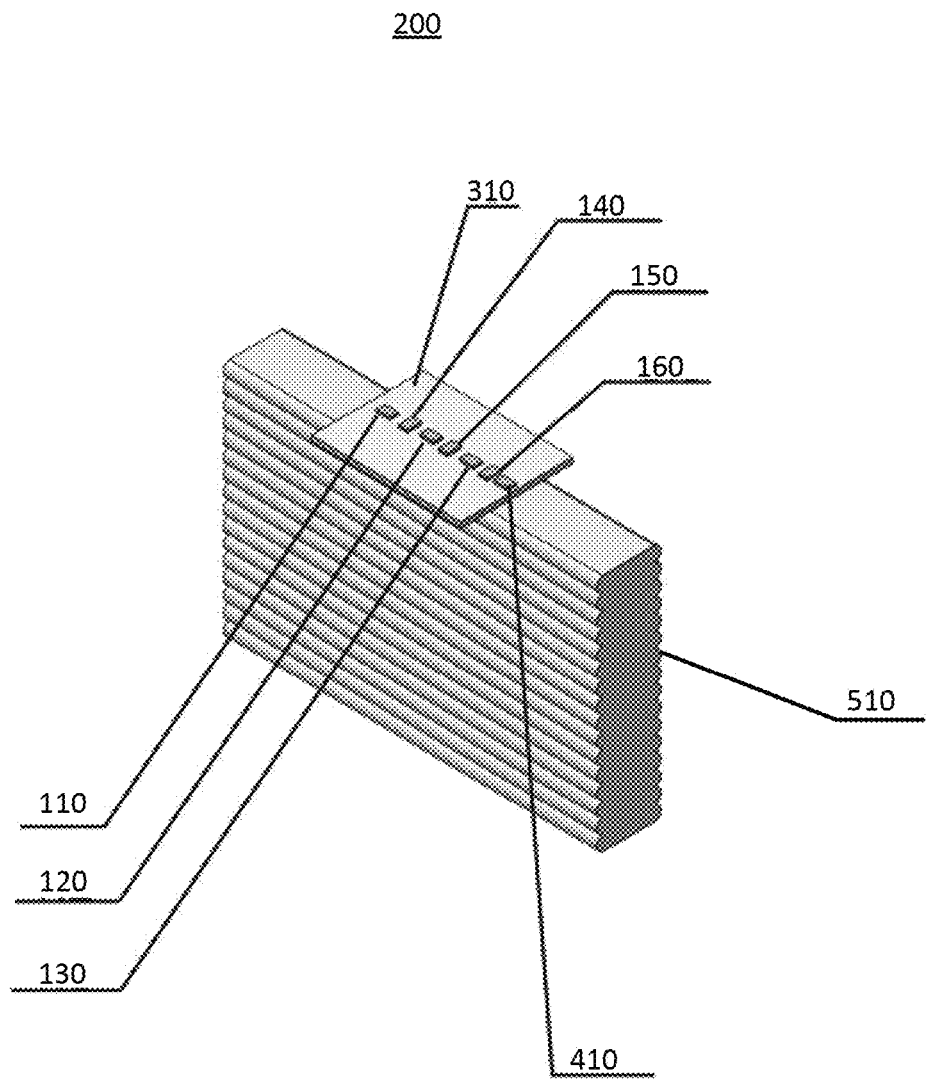
FIG. 2A is a schematic diagram illustrating an exemplary environment in which some embodiments may operate.

FIG. 2A provides a diagram layout 200 of the embedded sensor in the 3D-printed building structure. In some embodiments, the embedded sensor 110, 120, 130, 140, 150, 160 may be placed on the 3D-printed layer 510 during printing. Markings may be applied to the fabric substrate 310 for manual centering of the sensor along with the 3D-printed layer 510 axes. In one embodiment, the marked sensor symmetry axis may coincide with the printed layer symmetry axis. In one embodiment, thermal sensor 410 may calculate thermal deformation based on detected temperatures and material characteristics.

A load analysis may be performed on models of the particular 3D-printed building structure to determine locations of where embedded sensors may be placed. For example, the analysis may identify locations about the 3D-printed building structure where the structure may experience potential compression or weight or pressure forces at locations about the 3D-printed building structure.

Figure 2B:
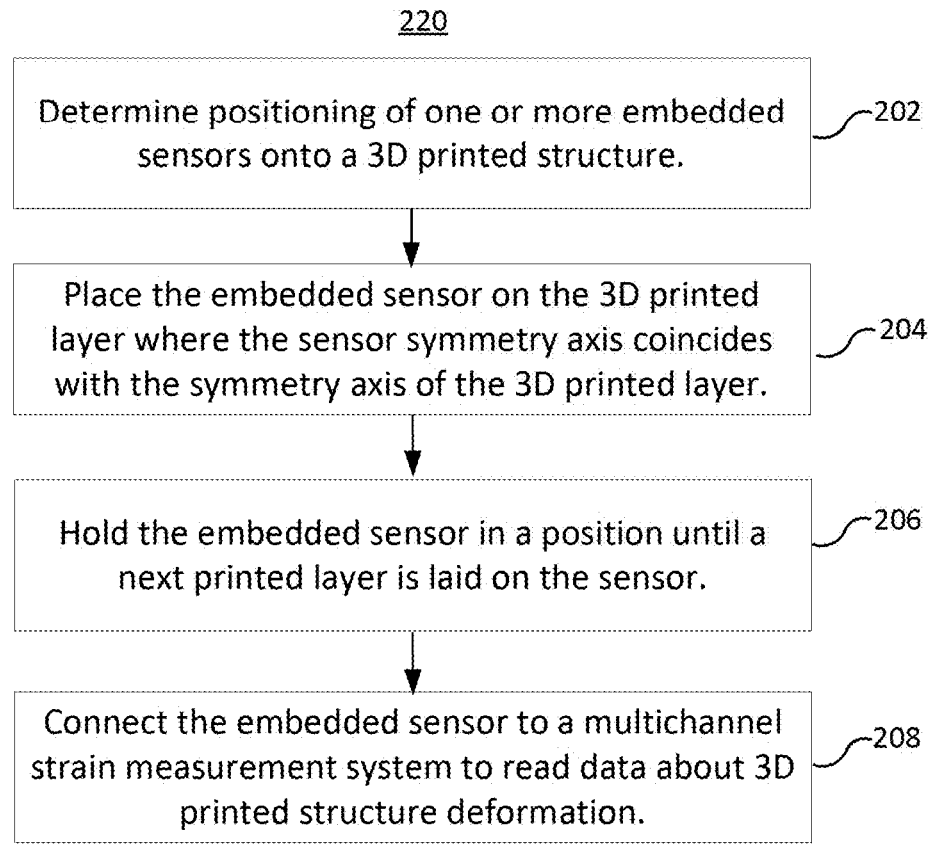
FIG. 2B is a diagram illustrating an exemplary method that may be performed in which some embodiments may operate.

FIG. 2B provides a flowchart of an example method of installing an embedded sensor in a 3D-printed building structure 220. At a first process step 202, positioning of one or more embedded sensors onto a 3D-printed building structure may be determined. At process step 202, the embedded sensor may be placed where measurable strain may be expected on the 3D-printed building structure. This may involve, for example, placing the embedded sensor where measurable strain in the required direction due to the application of force on the 3D-printed building structure may be expected. The finite element method may be applied to determine expected strain and direction for multi-axial strain situations. The finite element method is a systematic way to convert functions in an infinite-dimensional function space to first functions in a finite-dimensional function space. At step 202, areas where the parameters of materials within the 3D-printed building structure may change dramatically in different directions may be determined. For 3D-printed building structures, this area is along the printed layers where the object's linear length ratio to linear width is large. Additionally, areas which experience large temperature gradients during printing and relaxation of the 3D-printed building structure must be identified. At step 202, the embedded sensor may be arranged away from the panel's edges where the influence of edge effects is high.

At process step 204, the embedded sensor may be placed on the 3D-printed layer 510 where the sensor symmetry axis coincides with the symmetry axis of printed layer 510. At process step 206, the embedded sensor may be held in position until a next printed layer is laid on the sensor. At process step 208, the embedded sensor may be connected to a multichannel strain measurement system to read data about the 3D-printed building structure deformation during printing.

Method of Stress Monitoring a 3D-Printed Building Structure by Embedded Sensors

Figure 3:
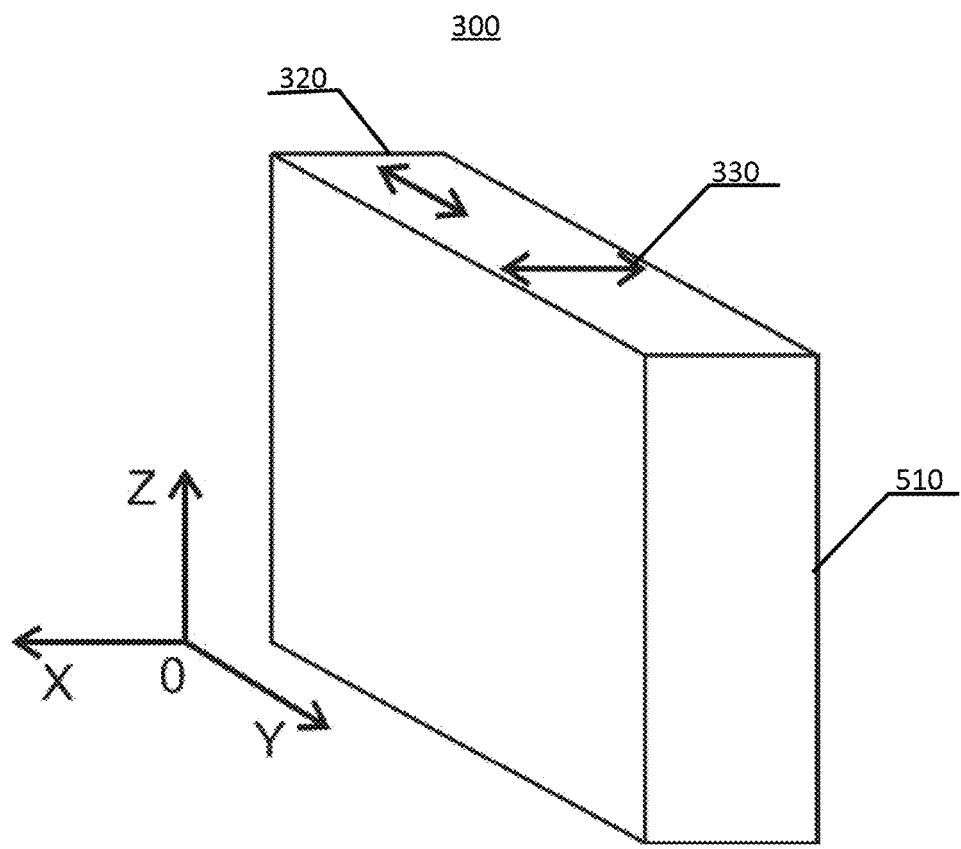
FIG. 3 is a schematic diagram illustrating an exemplary environment in which some embodiments may operate.

FIG. 3 illustrates a perspective view 300 of strain vectors measured by embedded sensors in a 3D-printed building structure. In one embodiment, the embedded strain gauges 110, 120, and 130 may measure tensile and compression deformations along the X-axis 330 of the 3D-printed layer 510. Embedded strain gauges 140, 150, and 160 may measure tensile and compression deformations along the Y-axis 320 of 3D-printed layer 510. Tensile stress and strain may occur when forces stretch an object, causing elongation, where the change in length is positive. Compressive stress and strain may occur when forces contract an object, causing shortening of the object, where the change in length is negative.

Figure 4:
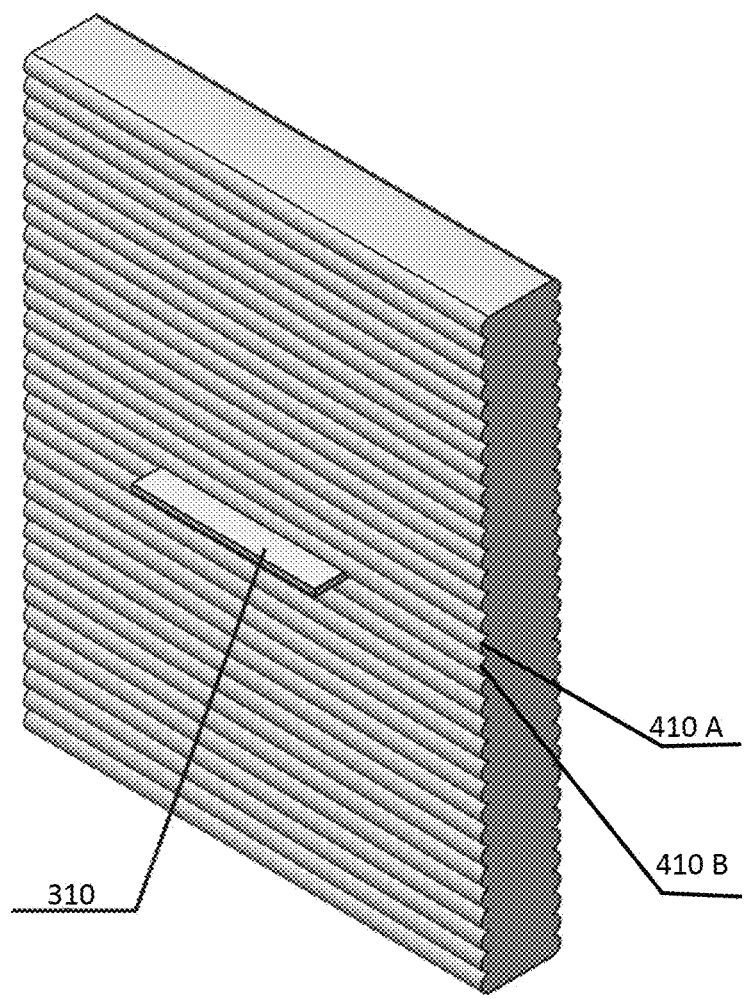
FIG. 4 illustrates a schematic diagram illustrating an exemplary environment in which some embodiments may operate.

FIG. 4 illustrates a perspective view of an exemplary environment 400 of a 3D-printed building structure with an embedded sensor in fabric substrate 310. In one embodiment, after the embedded sensor installation into the 3D-printed building structure, subsequent 3D-printed layers are laid over the sensor exerting a compressive effect on the embedded sensor. In exemplary environment 400, 3D-printed layers may be laid consecutively as demonstrated in layer 410A and 410B. The embedded sensor and fabric substrate 310 may be embedded between printed layers at any point in the 3D-printing process. Data obtained from the embedded sensor may contain information about the value of deformation that occurs during the printing process. In some embodiments, the 3D-printed building structure relaxes after printing is complete. The relaxation process leads to shrinkage of the 3D-printed material, which may cause complex deformation of the 3D-printed building structure. The occurring deformation evaluation at the production phase is obtained by the embedded sensor. In some embodiments, the data accumulated from the embedded sensor on the deformation value during the production process, including printing and required post-processing operations, is utilized at the final stage of production of the 3D-printed building structure for quality control. The deformation value is the measurement of strain from a compressive or tensile stress, representing displacement of a material relative to the material's initial length. The obtained deformation value is compared with a deformation threshold value, which may be determined by the type of material and type of 3D-printed building structure. In further embodiments, the embedded sensors may be used to measure tensile and compressive deformations during transportation of the 3D-printed location to the intended location.

Figure 5:
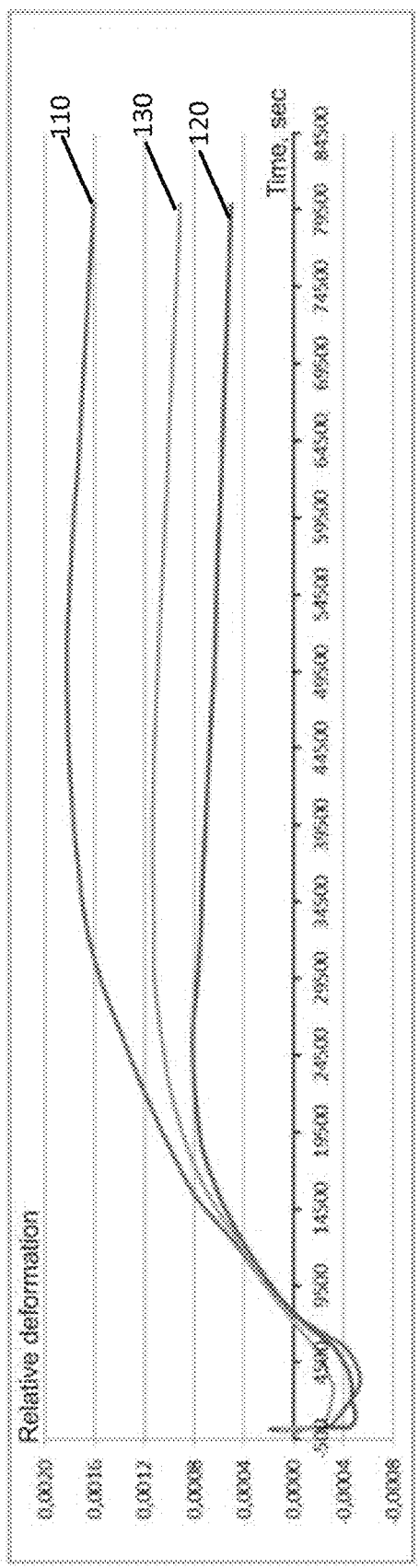
FIG. 5 illustrates a graph displaying relative deformation over time, recorded from strain gauges.
Figure 6:
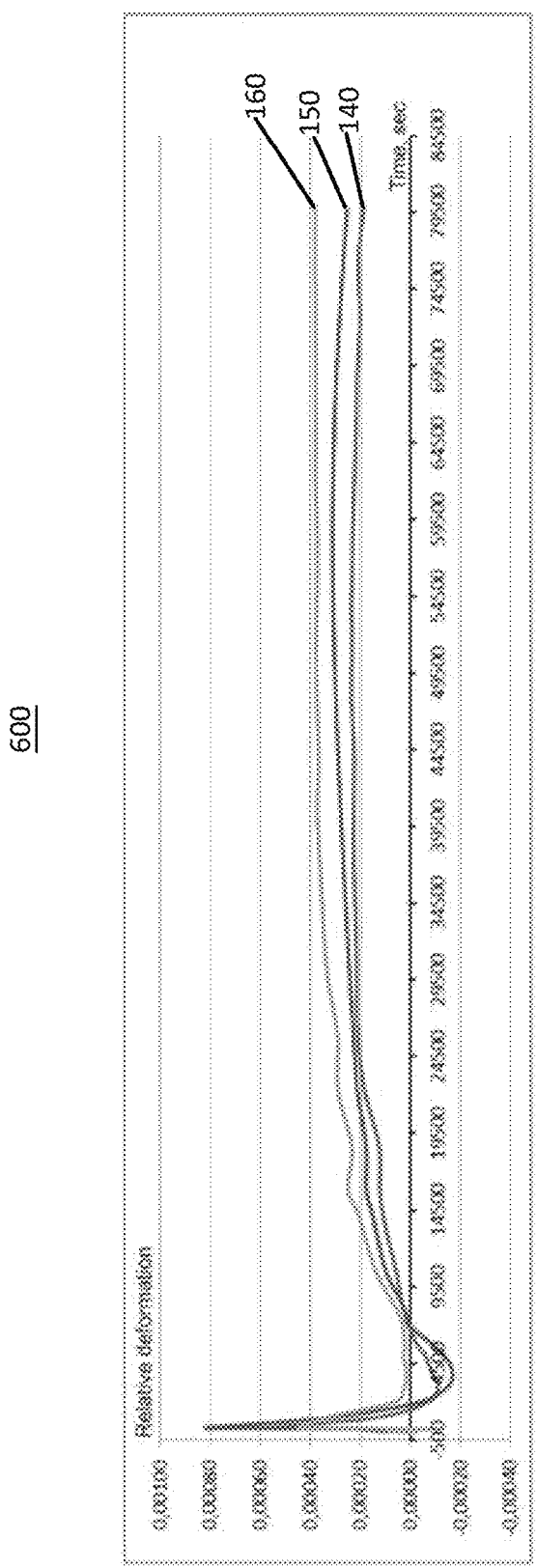
FIG. 6 illustrates a graph displaying relative deformation over time, recorded from strain gauges.

FIG. 5 illustrates graph 500 of thermal compensated longitudinal relative deformation of the 3D-printed building structure over time, recorded from strain gauges 110, 120, 130. FIG. 6 illustrates graph 600 of thermal compensative cross relative deformation of the 3D-printed building structure over time, recorded from strain gauges 140, 150, 160. Signal differences observed in FIG. 5 and FIG. 6 are caused due to heterogeneity of the 3D-printed building structure. Due to heterogeneity of the 3D-printed building structure, an average signal calculation from strain gauges 110, 120, 130 may be used to obtain the true longitudinal deformation value, and an average signal calculation from strain gauges 140, 150, 160 may be used to obtain the true cross deformation value.

Method of Installing Surface Sensors in a 3D-Printed Building Structure

Figure 7:
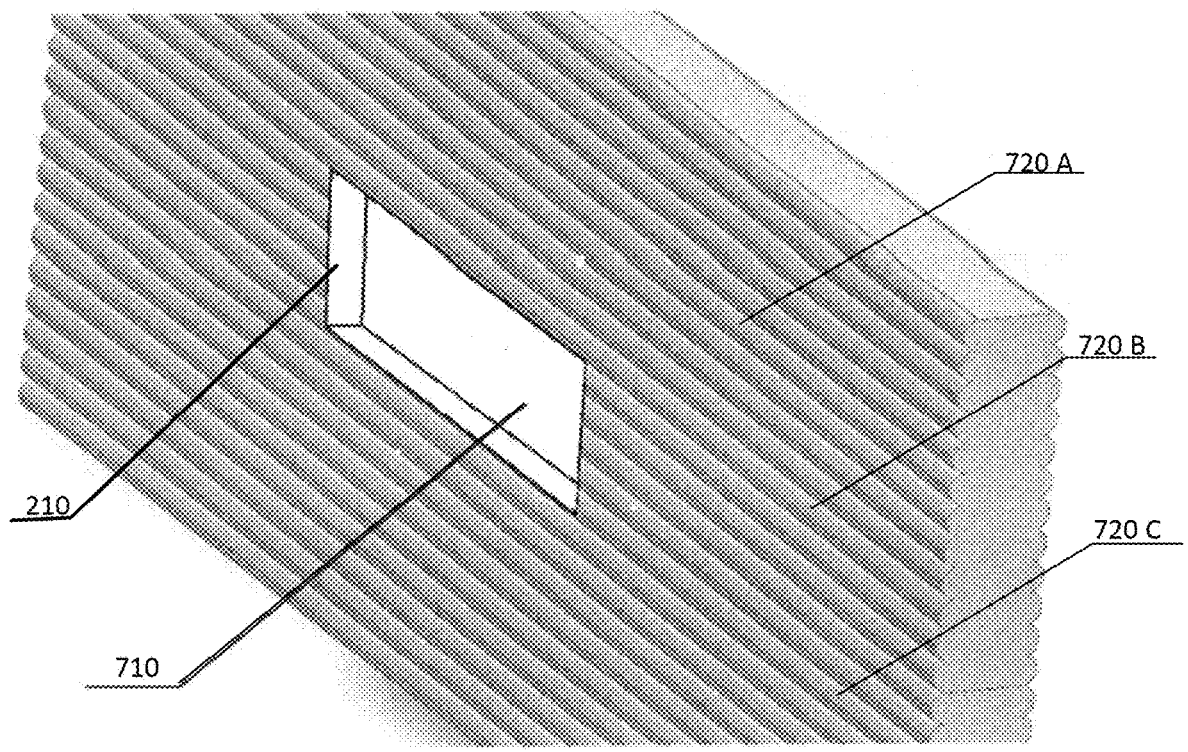
FIG. 7 is a schematic diagram illustrating an exemplary environment in which some embodiments may operate.

FIG. 7 illustrates a perspective view 700 of a milled space in the 3D-printed building structure. In one embodiment, after determining the optimum area for positioning of a surface sensor, the surface sensor may be placed in a position where measurable strain in the required direction due to the application of force can be expected on the 3D-printed building structure. In one embodiment, the finite element method may be used to determine the expected strain and direction for multi-axial strain situations and thus the required measurement range for the intended position. Ideally, surface sensors would be positioned at locations (e.g., interior surface locations) away from the edges of the 3D-printed building structure. The edges of the 3D-printed building structure may have increased or higher influence on a surface sensor due to edge effects where fluctuation in a structure is more common. In one embodiment, surface sensors may be installed next to embedded sensors. In one embodiment, optimal locations for positioning surface sensors may be in areas that experience large temperature gradients during printing and relaxation of the 3D-printed building structure. After 3D printing of the structure is completed, milled grooves 710 are etched to attach the strain gauges to the external surface of the 3D-printed building structure. In one embodiment, milled groove 710 may not exceed the height of printed layers 720A, 720B, or 720C to decrease the impact of mechanical processing on the surface strain. In one embodiment, milled groove 710 may be cleaned by an alcohol-soaked cloth and all fine particles may be removed from the milled groove 710. While perspective view 700 demonstrates a frame 210 placed in milled groove 710 between 3D-printed layers 720B and 720C, in some embodiments, multiple frames 210 may be horizontally stacked between various layers 720A, 720B, and 720C.

Figure 8:
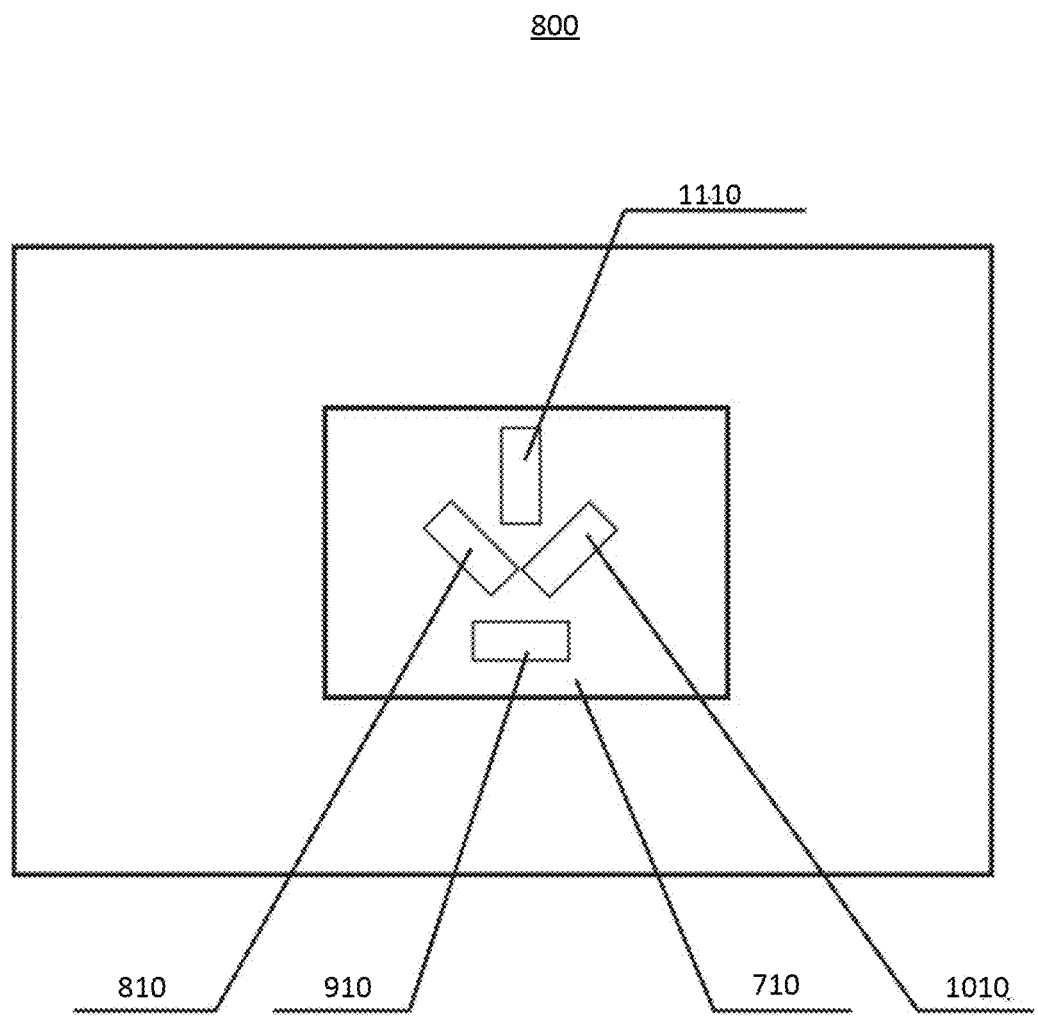
FIG. 8 is a schematic diagram illustrating an exemplary environment in which some embodiments may operate.

FIG. 8 illustrates a perspective view 800 of surface strain gauge orientation. In one embodiment, surface strain gauges 810, 910, 1010, 1110 may be glued into milled groove 710 at an angle of 0° to the direction of the 3D-printed layers as illustrated by strain gauge 910. In some embodiments, surface strain gauges may be glued into milled groove 710 at an angle of 45° to the direction of the 3D-printed layers as illustrated by strain gauge 810, 1010. In one embodiment, surface strain gauges may be glued into the milled groove 710 at an angle of 90° as illustrated by strain gauge 1110. In one embodiment, surface sensors may be protected by a plastic cover that matches the shape of a milled groove 710.

Figure 9:
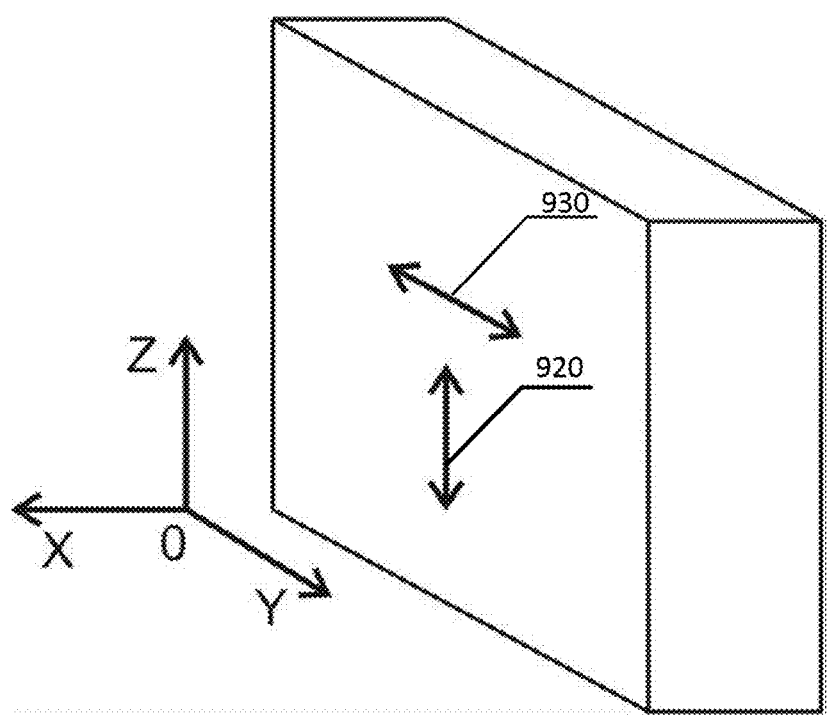
FIG. 9 is a schematic diagram illustrating an exemplary environment in which some embodiments may operate.

Method of Monitoring Structure Stress in a 3D-Printed Building Structure with Surface Sensors FIG. 9 illustrates a perspective view 900 of strain vectors measured by a surface sensor in the 3D-printed building structure. In one embodiment, once the surface sensor is installed in the 3D-printed building structure, the surface sensor may measure tensile and compressive deformation along the Z-axis 920 of printing layers with surface strain gauge 910, along the Y-axis 930 of printing layers with surface strain gauge 1110, and intermediate directions with surface strain gauges 810, 1010. Immediately after installation of the surface sensors in the 3D-printed building structure, the surface sensor may begin to measure the deformation of the 3D-printed building structure that occurs during the relaxation process. As mentioned above, the relaxation process leads to shrinkage or compression of the material, which may cause complex deformation of the 3D-printed building structure. In one embodiment, a deformation evaluation may be performed at the production phase with data obtained by the surface sensor or plurality of surface sensors. In some embodiments, data collected from the surface sensor or plurality of surface sensors on the deformation values accumulated during the production phase may be used in the final stage of production for quality control of the 3D-printed building structure. In one embodiment, the deformation values obtained by the surface sensors may be compared with a deformation threshold value, which is determined by the material type of the 3D-printed building structure. In one embodiment, the surface sensor or plurality of surface sensors may measure tensile and compressive deformation during the transportation phase of the 3D-printed building structure to a final location.

Figure 10:
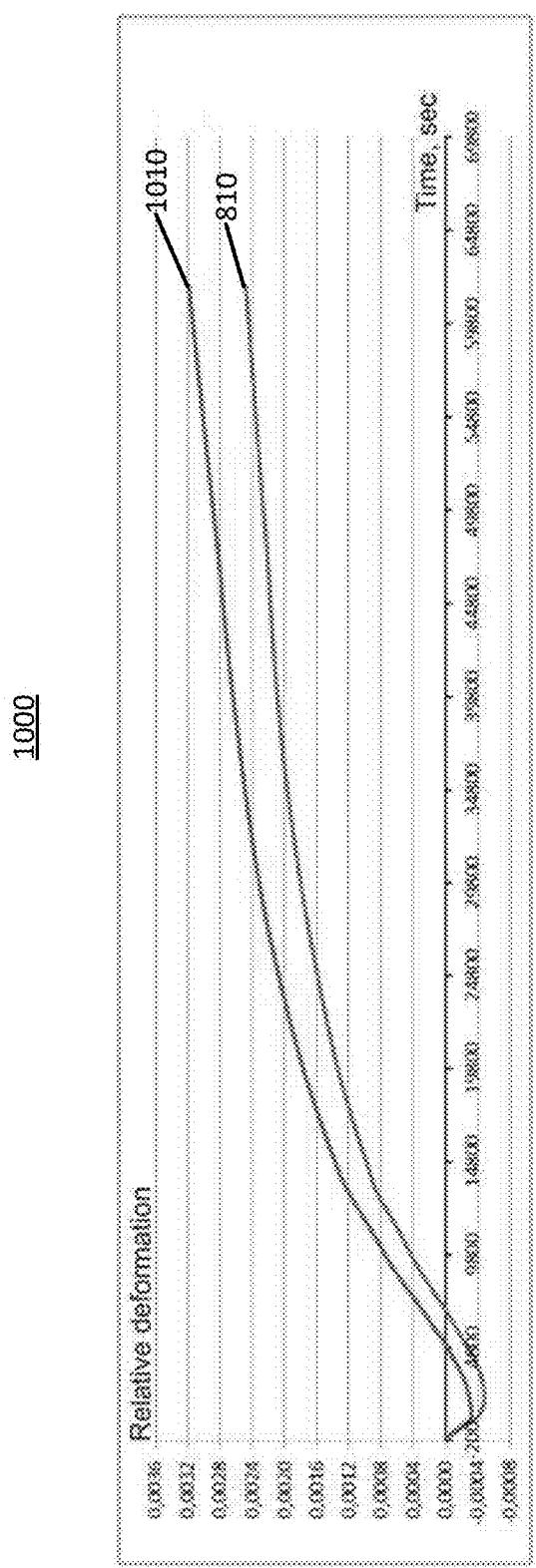
FIG. 10 illustrates a graph displaying relative deformation over time, recorded from strain gauges.

FIG. 10 illustrates graph 1000 of thermal compensated deformation data of the 3D-printed building structure over time, recorded from strain gauges 810 and 1010. FIG. 10 depicts the surface relative deformation at an angle of 45 degrees to the direction of laying the printed layers, thus the deformation change is equal for strain gauge 810 and strain gauge 1010. As shown by the lines corresponding to strain gauge 810 and strain gauge 1010, for some time the signals are negative, indicating that the 3D-printed building structure was compressed in that interval.

Figure 11:
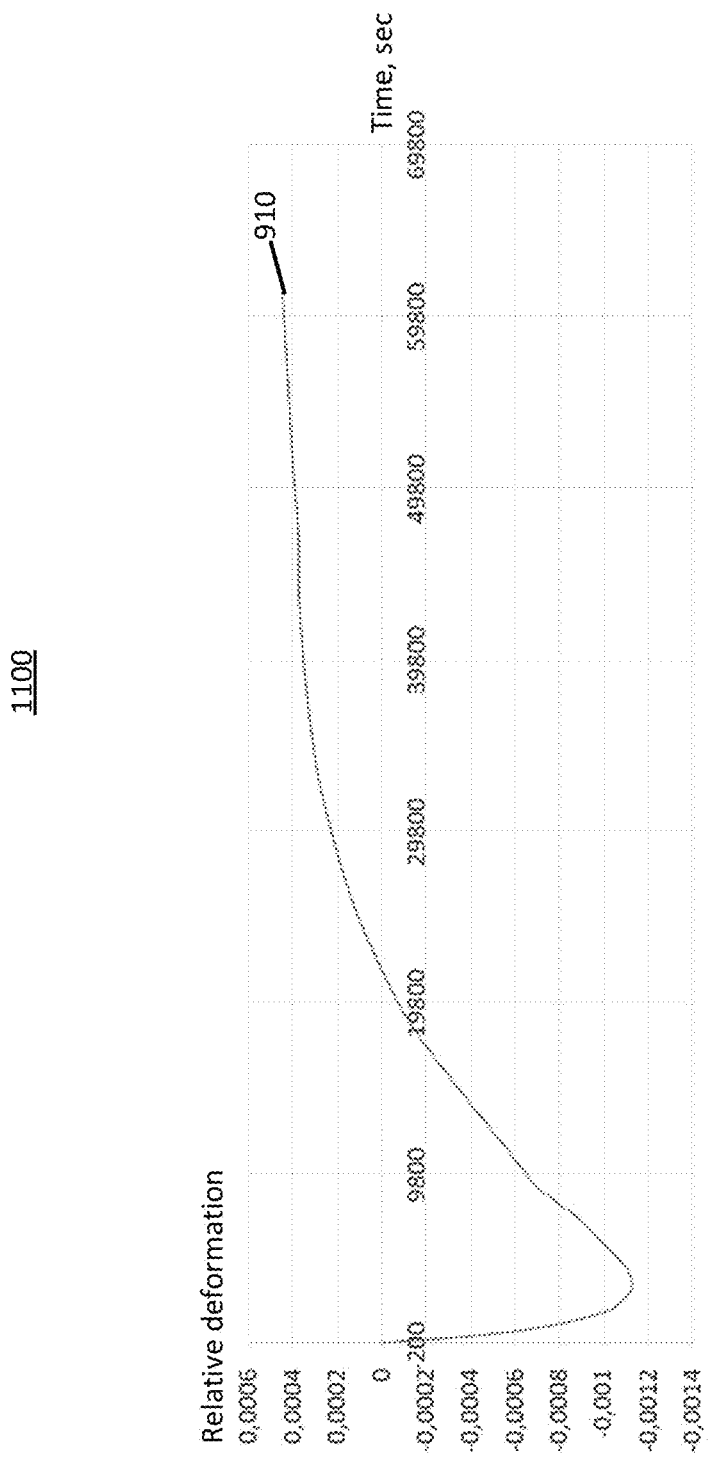
FIG. 11 illustrates a graph displaying thermal compensated relative deformation over time, recorded from a strain gauge.

FIG. 11 illustrates graph 1100 of thermal compensated relative deformation data of the 3D-printed building structure over time, recorded from strain gauge 910. The signal from strain gauge 910 demonstrates longitudinal surface deformation directed along the direction of the printed layers. As demonstrated by the line corresponding to data from strain gauge 910, the graph indicates that at first, the 3D-printed building structure was compressed, corresponding with a negative value, between 200 seconds and 19800 seconds. At around 19800 seconds, line 910 shifts to the positive direction, indicating that the 3D-printed building structure was stretched, corresponding with positive deformation.

Figure 12:
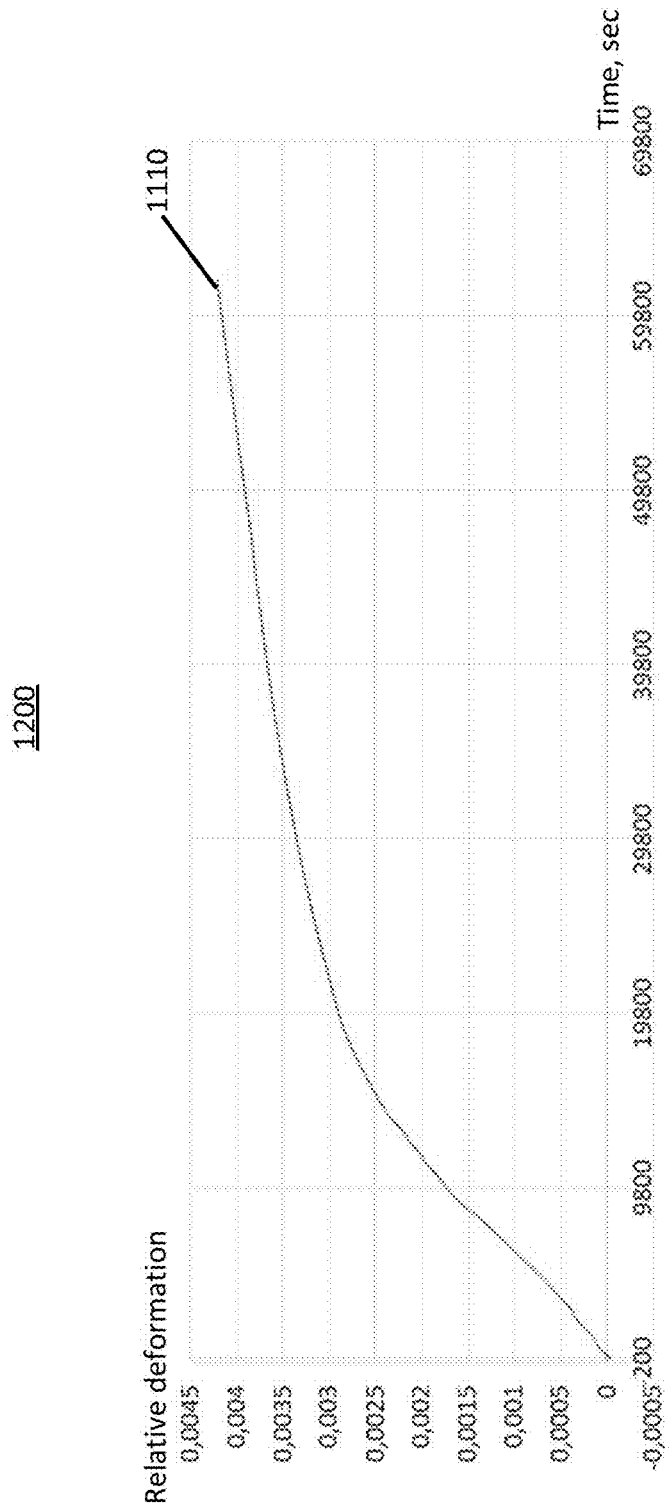
FIG. 12 illustrates a graph displaying relative deformation over time, recorded from a strain gauge.

FIG. 12 illustrates graph 1200 thermal compensated relative deformation data of the 3D-printed building structure over time, recorded from strain gauge 1110. The signal from strain gauge 1110 demonstrates cross surface deformation. In this embodiment, the strain gauge 1110 was glued at an angle of 90 degrees to the direction of the printed layers. The line corresponding to data from strain gauge 1110 demonstrates positive deformation over all time. Positive deformation over all time indicates that the 3D-printed building structure experienced tensile internal stresses.

Combined Method of 3D-Printed Building Structure Stress Monitoring

Figure 13:
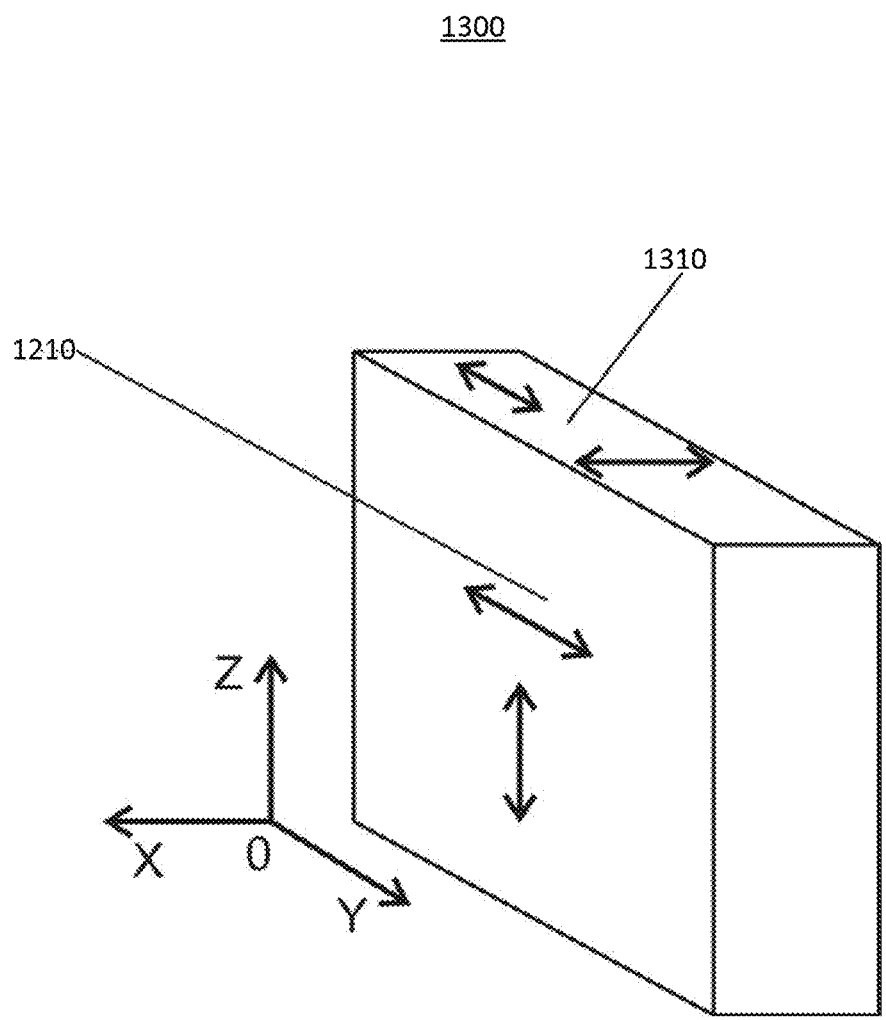
FIG. 13 is a schematic diagram illustrating an exemplary environment in which some embodiments may operate.

In one embodiment, during post-processing, embedded and surface sensor data may be combined by a data processing system. FIG. 13 illustrates a perspective view 1300 of measured deformation vectors by both the embedded and surface sensors. In one embodiment, surface sensors may provide strain measuring in the vertical plane 1210, in orthogonal directions along the X and Y-axis. The embedded sensors may provide strain measuring in the horizontal plane 1310, in orthogonal directions along the Y and Z axis. In one embodiment, combining data from surface sensors and embedded sensors may provide strain data in three mutually orthogonal planes, and therefore an analysis of the spatial behavior of the 3D-printed building structure. Additionally, joint processing of data from surface sensors and embedded sensors may decrease total stress measurement error. Further, when measured together, surface sensors and embedded sensors may process data related to shear deformations, which may have a significant impact on 3D-printed building structures.

In one embodiment, a 120×60 mm embedded sensor made using six linear strain gauges 110, 120, 130, 140, 150, 160, and one thermal sensor 410 may be installed in the wall by gluing the embedded sensor into the fabric substrate. In one embodiment, the embedded sensor may be placed on the 3D-printed layer of the 3D-printed building structure in accordance with FIG. 2 during the printing process, where subsequent 3D-printed layers may be laid on the embedded sensor. In some embodiments, the embedded sensor may be connected to a multichannel strain measurement system using a terminal block to read data regarding deformation in the 3D-printed building structure.

Figure 14:
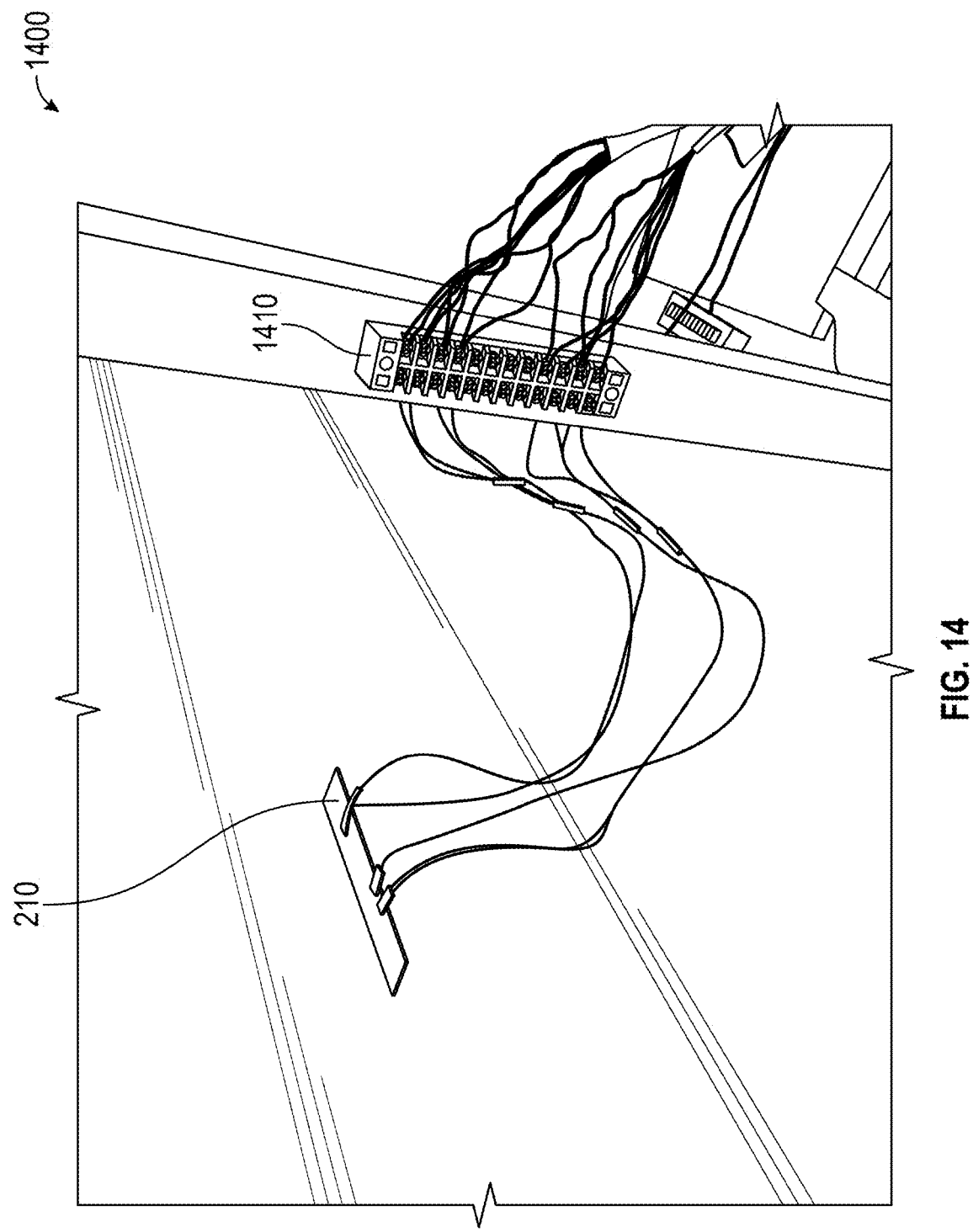
FIG. 14 displays an exemplary environment in which some embodiments may operate.

FIG. 14 demonstrates an example embodiment 1400 of a 3D-printed building structure with embedded sensors. In one embodiment, the embedded sensor may be connected via wires to a multichannel strain measurement system using a terminal block 1410 to read data correlated to the 3D-printed building structure deformation. While FIG. 14 demonstrates frame 210 extending beyond the wall, the frame 210 may be constructed to the width of the 3D-printed material such that the frame 210 does not extend beyond the wall but allows for connecting wires to extend beyond the wall, allowing for connection to a terminal block 1410. In some embodiments, frame 210 may be sized to fit within the width of the 3D-printed building structure.

Figure 15:
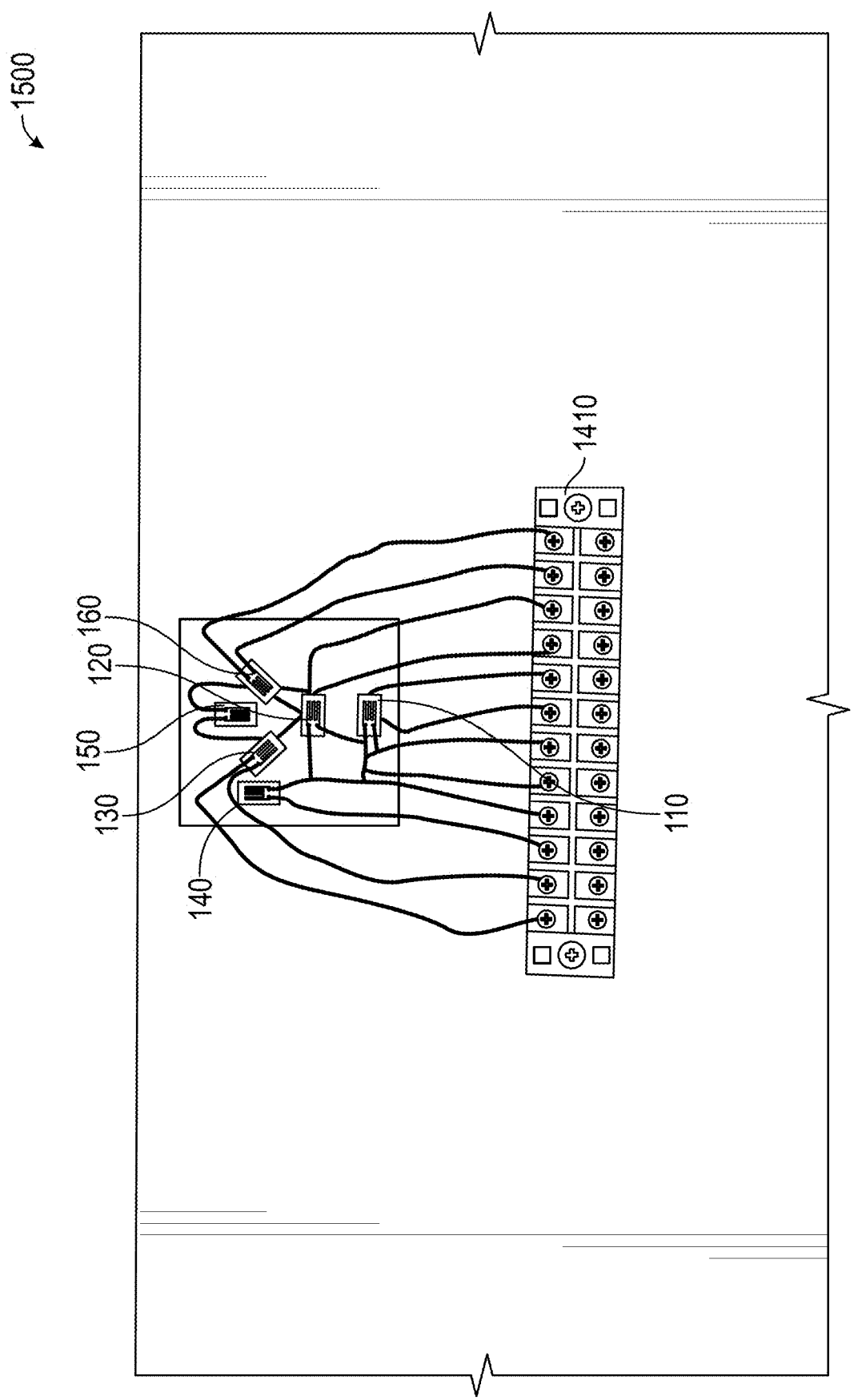
FIG. 15 displays an exemplary environment in which some embodiments may operate.

FIG. 15 demonstrates an example embodiment 1500 of a 3D-printed building structure with surface strain gauges 110, 120, 130, 140, 150, 160 connected to terminal block 1410 via connecting wires. In some embodiments, a shallow groove may be carved into the 3D-printed building structure after printing. This shallow groove forms a recess in the 3D-printed building structure. The recess may have a wall that is substantially planar. A sensor system as described herein may be attached to the wall using an adhesive or other bonding composition. The bonding composition may be of a type to permanently adhere the sensor system to the wall. Alternatively, the bonding composition may be of a type that allows the sensor system to be removed from the wall (e.g., for temporary monitoring of the 3D-printed building structure).

In one embodiment, after cleaning the groove with an alcohol-soaked cloth, six linear strain gauges may be glued into the shallow groove. In one embodiment, the six strain gauges may be connected to a multichannel strain measurement system using a terminal block to read deformation data related to the surface of the 3D-printed building structure.

In some embodiments, the material of the 3D-printed building structure may be reinforced by fiberglass. In the embodiment utilizing fiberglass, strain gauge sensors 110, 120, 130, 140, 150, 160 may be mounted along with fiberglass on the 3D-printed layer 510. In additional embodiments, strain gauges may include linear strain gauges, rosette strain gauges, half-bridge strain gauges, column strain gauges, or shear strain gauges.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense. Certain changes and modifications may be practiced, and it is understood that the disclosure is not to be limited by the foregoing details, but rather is to be defined by the scope of the appended claims.

What is claimed is:

1. A method of monitoring stress characteristics of a three dimensional printed (3D-printed) large-scale building structure, the method comprising:
depositing multiple layers of printing material to form a 3D-printed large-scale building structure, the depositing multiple layers comprising:
placing a first sensor system onto a layer of printing material after the layer of printing material has been deposited; and
depositing a following layer of the printing material onto a portion of the previously deposited layer of printing material and covering a portion of the placed first sensor system with the following layer of printing material, wherein the first sensor system comprises:
a first frame;
a first fabric substrate disposed over a portion of the first frame;
a first strain gauge attached to the first fabric substrate in a first position; and
a second strain gauge attached to the first fabric substrate in a second position perpendicular to the first position; and
measuring, via the first sensor system, one or more outputs of the first and second strain gauges.

2. The method of claim 1, the depositing multiple layers further comprising:
depositing a plurality of additional layers of printing material onto the following layer of printing material;
placing a second sensor system onto the previously deposited additional layers of printing material;
depositing a subsequent layer of printing material onto a portion of the most recent deposited additional layer and covering a portion of the placed second sensor system, wherein the second sensor system comprises:
a second frame;
a second fabric substrate disposed over a portion of the second frame;
a third strain gauge attached to the second fabric substrate; and
a fourth strain gauge attached to the second fabric substrate in a position perpendicular to a position of the third strain gauge; and
measuring, via the second sensor system, one or more outputs of the third and fourth strain gauges.

3. The method of claim 1, where the first sensor system further comprises a third strain gauge placed onto the first fabric substrate in a third position, the third strain gauge positioned from 15 to 75 degrees relative to a vertical axis of the first strain gauge.

4. The method of claim 1, further comprising:
measuring, via the first sensor system, values to determine a tensile and/or compressive deformation occurring during the depositing of the multiple layers of the printing material.

5. The method of claim 1, further comprising:
measuring, via the first sensor system, values to determine tensile and/or compressive deformation occurring in the 3D printed large-scale building structure during changes to relaxation of the deposited printing material.

6. The method of claim 1, wherein the fabric substrate includes an impregnation material that provides adhesion between the fabric substrate, the previously deposited layer and the following layer of printing material.

7. A method of monitoring stress characteristics of a three dimensional-printed (3D-printed) large-scale building structure, the method comprising:
depositing multiple layers of a printing material to form a 3D-printed large-scale building structure, the multiple layers having an external side surface;
milling a recess into a portion of the external side surface of the 3D-printed large-scale building structure, the recessed portion comprising a planar wall;
placing a sensor system onto the planar wall, wherein the sensor system comprises:
a frame;

a fabric substrate disposed over a portion of the frame;
a first strain gauge attached to the fabric substrate in a first position; and
a second strain gauge attached to the fabric substrate in a second position perpendicular to the first position; and
measuring, via the sensor system, an output of the sensor system to determine changes in output values of the sensor system.

8. The method of claim 7, wherein the sensor system further comprises a third strain gauge placed onto the fabric substrate in a third position, the third strain gauge positioned from 15 to 75 degrees relative to a vertical axis of the first strain gauge.

9. The method of claim 8, wherein the sensor system is configured to measure strain in the 3D-printed large-scale building structure in an X and Y-axis, and along a Y and Z-axis.

10. A sensor system for measuring stress characteristics of a three-dimensional (3D) printed large-scale building structure, the sensor system comprising:
a frame;
a fabric substrate disposed over a portion of the frame; and
a plurality of strain gauges including a first strain gauge and a second strain gauge, wherein the first strain gauge is attached to the fabric substrate in a first position, and the second strain gauge is attached to the fabric substrate in a second position perpendicular to the first position, wherein the sensor system is configured to be placed within a 3D printed large-scale building structure to measure stress characteristics of the 3D printed large-scale building structure.

11. The sensor system of claim 10, wherein the plurality of strain gauges each comprise a circuit whose measured electrical resistance varies with changes in strain across the circuit.

12. The sensor system of claim 10, wherein the fabric substrate is characterized as having a property where the fabric substrate is more flexible than the material from which the frame is constructed.

13. The sensor system of claim 12, wherein the fabric substrate has a Young modulus value many times less than a Young modulus value of the 3D-printed large-scale building structure.

14. The sensor system of claim 10, further comprising a plurality of connecting wiring attached to the plurality of strain gauges and are fixed to the frame to reduce mechanical impact on the one or more strain gauges.

15. The sensor system of claim 10, wherein the fabric substrate further comprises an impregnation material that provides adhesion between the fabric substrate and a deposited 3D-printed layer of the 3D printed large-scale building structure onto the sensor system.

16. The sensor system of claim 10, wherein the frame comprises dimensions of 10-80 mm in length and 10-50 mm in width.

17. The sensor system of claim 10, further comprising:
a third strain gauge attached to the fabric substrate in a third position, the third strain gauge positioned from about 15 to 75 degrees relative to a vertical axis of the first strain gauge.

18. The sensor system of claim 10, further comprising a thermal sensor attached to the frame and configured to measure the temperature of the 3D printed large-scale building structure.

19. A three-dimensional printed large-scale building structure comprising:
multiple layers of a deposited printing material forming a three-dimensional (3D) printed large-scale building structure;
a first sensor system integrally formed between two adjacent multiple layers, the first sensor system comprising:
a frame;
a fabric substrate disposed over a portion of the frame;
a first strain gauge attached to the fabric substrate in a first position; and
a second strain gauge attached to the fabric substrate in a second position perpendicular to the first position; and
circuitry configured to measure, via the first sensor system, one or more outputs of the first and second strain gauges.

20. The three-dimensional printed large-scale building structure of claim 19, wherein the first sensor system further comprises a third strain gauge attached to the fabric substrate in a third position, the third strain gauge positioned from about 15 to 75 degrees relative to a vertical axis of the first strain gauge.

21. A method of monitoring stress characteristics of a three dimensional printed (3D-printed) large-scale building structure, the method comprising:
depositing multiple layers of printing material to form a 3D-printed large-scale building structure;
milling a recession portion into the multiple layers of the deposited material, wherein the milled recession portion forms a substantially planar surface;
fixing a first sensor system onto the substantially planar surface, wherein the first sensor system comprises:
a first strain gauge placed in a first position; and
a second strain gauge placed in a second position perpendicular to the first position of the first strain gauge; and
measuring, via the first sensor system, one or more outputs of the first and second strain gauges.

22. The method of claim 21, wherein the first sensor system further comprises a third strain gauge placed in a third position, the third strain gauge positioned from 15 to 75 degrees relative to a vertical axis of the first strain gauge.

23. A three-dimensional (3D) printed large-scale building structure, comprising:
multiple layers of a deposited printing material forming a three-dimensional (3D) printed large-scale building structure, the multiple layers having a milled recess portion with a substantially planar surface; and
a first sensor system affixed to the substantially planar surface of the milled recess portion, the first sensor system comprising:
a first strain gauge placed in a first position; and
a second strain gauge placed in a second position perpendicular to the first position of the first strain gauge.

24. The three-dimensional printed large-scale building structure of claim 23, wherein the first sensor system further comprises a third strain gauge placed attached positioned from about 15 to 75 degrees relative to a vertical axis of the first strain gauge.

* * * * *